(12) United States Patent
Krohn

(10) Patent No.: US 7,119,129 B2
(45) Date of Patent: *Oct. 10, 2006

(54) UV CURABLE TRANSPARENT CONDUCTIVE COMPOSITIONS

(75) Inventor: Roy C. Krohn, Fort Gratiot, MI (US)

(73) Assignee: Allied PhotoChemical, Inc., Kimball, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/913,911

(22) Filed: Aug. 6, 2004

(65) Prior Publication Data

US 2005/0008973 A1 Jan. 13, 2005

Related U.S. Application Data

(63) Continuation of application No. 10/193,389, filed on Jul. 11, 2002, now Pat. No. 6,784,223, which is a continuation-in-part of application No. PCT/US01/00976, filed on Jan. 11, 2001.

(60) Provisional application No. 60/175,971, filed on Jan. 13, 2000.

(51) Int. Cl.
C08F 2/46 (2006.01)
C08G 59/14 (2006.01)
C08J 3/28 (2006.01)

(52) U.S. Cl. .................. 522/92; 522/100; 522/96; 522/90; 522/81; 427/508; 427/510; 427/512

(58) Field of Classification Search .............. 522/92, 522/81, 96, 100; 427/508, 510, 512
See application file for complete search history.

(56) References Cited

U.S. PATENT DOCUMENTS

| | | |
|---|---|---|
| 3,700,754 A | 10/1972 | Schmitt et al. |
| 3,953,643 A | 4/1976 | Cheung et al. |
| 3,968,056 A | 7/1976 | Bolon et al. |
| 3,988,647 A | 10/1976 | Bolon et al. |
| 4,049,844 A | 9/1977 | Bolon et al. |
| 4,088,801 A | 5/1978 | Bolon et al. |
| 4,113,894 A | 9/1978 | Koch, II |
| 4,187,340 A | 2/1980 | Oishi et al. |
| 4,188,449 A | 2/1980 | Lu et al. |
| RE30,274 E | 5/1980 | Bolon et al. |
| 4,256,591 A | 3/1981 | Yamamoto et al. |
| 4,271,212 A | 6/1981 | Stengle |
| 4,338,376 A | 7/1982 | Kritzler |
| 4,391,858 A | 7/1983 | Batzill |
| RE31,411 E | 10/1983 | Bolon et al. |
| 4,420,500 A | 12/1983 | Nakatani et al. |
| 4,439,494 A | 3/1984 | Olson |
| 4,455,205 A | 6/1984 | Olson et al. |
| 4,472,019 A | 9/1984 | Bishop et al. |
| 4,478,876 A | 10/1984 | Chung |
| 4,479,860 A | 10/1984 | Hayase et al. |
| 4,495,042 A | 1/1985 | Hayase et al. |
| 4,496,475 A | 1/1985 | Abrams |
| 4,513,023 A | 4/1985 | Wary |
| 4,533,445 A | 8/1985 | Orio |
| 4,539,258 A | 9/1985 | Panush |
| 4,547,410 A | 10/1985 | Panush et al. |
| 4,551,361 A | 11/1985 | Burzynski et al. |
| 4,557,813 A | 12/1985 | Heil et al. |
| 4,557,975 A | 12/1985 | Moore |
| 4,559,118 A | 12/1985 | Heil et al. |
| 4,594,315 A | 6/1986 | Shibue et al. |
| 4,609,612 A | 9/1986 | Berner et al. |
| 4,640,981 A | 2/1987 | Dery et al. |
| 4,665,342 A | 5/1987 | Topp et al. |
| 4,666,783 A | 5/1987 | Heil et al. |
| 4,666,821 A | 5/1987 | Hein et al. |
| 4,684,353 A | 8/1987 | deSouza |
| 4,738,899 A | 4/1988 | Bluestein et al. |
| 4,788,108 A | 11/1988 | Saunders, Jr. et al. |
| D298,917 S | 12/1988 | Krohn |
| 4,806,257 A | 2/1989 | Clark et al. |
| 4,814,208 A | 3/1989 | Miyazaki et al. |
| 4,816,717 A | 3/1989 | Harper et al. |
| 4,822,646 A | 4/1989 | Clark et al. |
| 4,828,758 A | 5/1989 | Gillberg-Laforce et al. |
| 4,877,512 A | 10/1989 | Bowns et al. |
| 4,900,763 A | 2/1990 | Kraushaar |
| 4,911,796 A | 3/1990 | Reed |
| 4,959,178 A | 9/1990 | Frentzel et al. |
| 4,960,614 A | 10/1990 | Durand |
| 4,964,948 A | 10/1990 | Reed |
| 4,975,471 A | 12/1990 | Hayase et al. |
| 5,006,397 A | 4/1991 | Durand |
| 5,049,480 A | 9/1991 | Nebe et al. |
| 5,068,714 A | 11/1991 | Seipler |
| 5,076,963 A | 12/1991 | Kameyama et al. |
| 5,100,848 A | 3/1992 | Enomoto et al. |

(Continued)

FOREIGN PATENT DOCUMENTS

DE 198 35 917 A1 2/2000

(Continued)

*Primary Examiner*—Sanza L. McClendon
(74) *Attorney, Agent, or Firm*—Brooks Kushman P.C.

(57) ABSTRACT

The present invention discloses an ultraviolet light curable transparent conductive composition and method for making such a composition that may be used to produce a transparent conductive coating on a suitable substrate. These coatings may be used in such applications as touch screens, membrane switches, TV screens, and VCRs. The disclosed composition does not contain any significant amount of volatile organic solvents that do not become incorporated in the active layer after curing.

20 Claims, No Drawings

U.S. PATENT DOCUMENTS

| | | | |
|---|---|---|---|
| 5,104,929 A | 4/1992 | Bilkadi | |
| 5,116,639 A | 5/1992 | Kolk et al. | |
| 5,128,387 A * | 7/1992 | Shustack | 522/92 |
| 5,128,391 A | 7/1992 | Shustack | |
| 5,149,971 A | 9/1992 | McElhaney et al. | |
| 5,180,523 A | 1/1993 | Durand et al. | |
| 5,180,757 A | 1/1993 | Lucey | |
| 5,183,831 A * | 2/1993 | Bielat et al. | 522/33 |
| 5,221,560 A | 6/1993 | Perkins et al. | |
| 5,225,170 A | 7/1993 | Kolk et al. | |
| 5,258,225 A | 11/1993 | Katsamberis | |
| 5,282,985 A | 2/1994 | Zabinski et al. | |
| 5,296,295 A | 3/1994 | Perkins et al. | |
| 5,326,636 A | 7/1994 | Durand et al. | |
| 5,356,545 A | 10/1994 | Wayte | |
| 5,384,160 A | 1/1995 | Frazzitta | |
| 5,395,876 A | 3/1995 | Frentzel et al. | |
| 5,424,182 A | 6/1995 | Marginean, Sr. et al. | |
| 5,453,451 A | 9/1995 | Sokol | |
| 5,454,892 A | 10/1995 | Kardon et al. | |
| 5,462,701 A | 10/1995 | Hagemeyer et al. | |
| 5,470,643 A | 11/1995 | Dorfman | |
| 5,470,897 A | 11/1995 | Meixner et al. | |
| 5,514,214 A | 5/1996 | Joel et al. | |
| 5,523,143 A | 6/1996 | Hagemeyer et al. | |
| 5,556,527 A | 9/1996 | Igarashi et al. | |
| 5,561,730 A | 10/1996 | Lochkovic et al. | |
| 5,565,126 A | 10/1996 | Kimura et al. | |
| 5,587,433 A | 12/1996 | Boeckeler | |
| 5,596,024 A | 1/1997 | Horie et al. | |
| 5,609,918 A | 3/1997 | Yamaguchi et al. | |
| 5,624,486 A | 4/1997 | Schmid et al. | |
| 5,633,037 A | 5/1997 | Mayer | |
| 5,686,792 A | 11/1997 | Ensign, Jr. | |
| 5,691,417 A | 11/1997 | Bremer et al. | |
| 5,698,310 A | 12/1997 | Nakamura et al. | |
| 5,716,551 A | 2/1998 | Unruh et al. | |
| 5,718,950 A | 2/1998 | Komatsu et al. | |
| 5,747,115 A | 5/1998 | Howell et al. | |
| 5,750,186 A | 5/1998 | Frazzitta | |
| 5,773,487 A | 6/1998 | Sokol | |
| 5,784,197 A | 7/1998 | Frey et al. | |
| 5,787,218 A | 7/1998 | Ohtaka et al. | |
| 5,833,724 A | 11/1998 | Wei et al. | |
| 5,837,745 A | 11/1998 | Safta et al. | |
| 5,866,628 A | 2/1999 | Likavec et al. | |
| 5,871,827 A | 2/1999 | Jaffe et al. | |
| 5,883,148 A | 3/1999 | Lewandowski et al. | |
| 5,888,119 A | 3/1999 | Christianson et al. | |
| 5,914,162 A | 6/1999 | Bilkadi | |
| 5,942,284 A | 8/1999 | Hiskes et al. | |
| 5,945,502 A | 8/1999 | Hsieh et al. | |
| 5,950,808 A | 9/1999 | Tanabe et al. | |
| 5,968,996 A | 10/1999 | Sanchez et al. | |
| 5,994,424 A | 11/1999 | Safta et al. | |
| 6,054,501 A | 4/2000 | Taniguchi et al. | |
| 6,165,386 A | 12/2000 | Endo et al. | |
| 6,211,262 B1 | 4/2001 | Mejiritski et al. | |
| 6,261,645 B1 | 7/2001 | Betz et al. | |
| 6,262,140 B1 | 7/2001 | Savant et al. | |
| 6,267,645 B1 | 7/2001 | Burga et al. | |
| 6,290,881 B1 | 9/2001 | Krohn | |
| 6,444,713 B1 | 9/2002 | Pachl et al. | |
| 6,500,877 B1 | 12/2002 | Krohn | |
| 6,509,389 B1 | 1/2003 | Krohn | |
| 6,713,000 B1 | 3/2004 | Krohn | |
| 6,716,893 B1 | 4/2004 | Krohn | |
| 6,767,577 B1 | 7/2004 | Krohn | |
| 6,784,223 B1 | 8/2004 | Krohn | |
| 6,805,917 B1 | 10/2004 | Krohn | |
| 6,897,248 B1 | 5/2005 | Krohn | |
| 2001/0008906 A1 | 7/2001 | Chawla | |
| 2001/0050357 A1 | 12/2001 | Krohn | |
| 2003/0017954 A1 | 1/2003 | Krohn | |
| 2003/0022957 A1 | 1/2003 | Krohn | |
| 2003/0044547 A1 | 3/2003 | Krohn | |
| 2003/0045596 A1 | 3/2003 | Krohn | |
| 2003/0053781 A1 | 3/2003 | Fabian | |
| 2003/0069324 A1 | 4/2003 | Sakano et al. | |
| 2003/0082305 A1 | 5/2003 | Krohn | |
| 2003/0119933 A1 | 6/2003 | Krohn | |
| 2003/0162859 A1 | 8/2003 | Krohn | |
| 2004/0005415 A1 | 1/2004 | Krohn | |
| 2004/0106718 A1 | 6/2004 | Krohn | |
| 2004/0167242 A1 | 8/2004 | Krohn | |
| 2005/0008973 A1 | 1/2005 | Krohn | |
| 2005/0101685 A1 | 5/2005 | Krohn | |
| 2005/0101686 A1 | 5/2005 | Krohn | |

FOREIGN PATENT DOCUMENTS

| | | |
|---|---|---|
| EP | 0 081 323 A1 | 6/1983 |
| EP | 0 540 884 | 10/1992 |
| EP | 0 530 141 A1 | 3/1993 |
| EP | 0 567 940 A1 | 11/1993 |
| EP | 0 711 801 A2 | 5/1996 |
| EP | 0 820 217 A1 | 1/1998 |
| GB | 1 550 382 | 8/1979 |
| JP | 61203108 A | 9/1986 |
| JP | 4267097 A | 9/1992 |
| JP | 5279436 A | 10/1993 |
| JP | 5311103 A | 11/1993 |
| JP | 6016721 A | 1/1994 |
| WO | WO 97/31051 | 8/1997 |
| WO | WO 97/45458 | 12/1997 |
| WO | WO 98/40171 | 9/1998 |
| WO | WO 98/47954 | 10/1998 |
| WO | WO 98/50317 | 11/1998 |
| WO | WO 00/62586 | 10/2000 |

* cited by examiner

UV CURABLE TRANSPARENT CONDUCTIVE COMPOSITIONS

CROSS-REFERENCE TO RELATED APPLICATION

This application is a continuation of U.S. application Ser. No. 10/193,389 filed Jul. 11, 2002, now U.S. Pat. No. 6,784,223, which, in turn, is a continuation-in-part of International Application Ser. No. PCT/US01/00976, filed Jan. 11, 2001 which, in turn, claims the benefit of U.S. Provisional Patent Application Ser. No. 60/175,971, filed Jan. 13, 2000.

TECHNICAL FIELD

The present invention relates to ultraviolet light (UV) curable compositions capable of producing a transparent conductive coating.

BACKGROUND OF THE INVENTION

UV radiation curable transparent conductive compositions are applied to a substrate through spraying, screen printing, dipping or brushing, thus forming a transparent conducting film or coating. Transparent conductive coatings transmit visible light while possessing electrical conductivity. Accordingly such coatings find application in automobiles, airplanes, etc. as electrodes for liquid crystal devices, exothermic resistors, and photosemiconductors.

UV curable conductive films offer advantages over typical heat curable films typically produced by chemical vapor deposition, sputtering, and sol-gelling. Heat curable compositions used for example in the sol-gel process require the use of organic solvents that contain a significant amount of volatile organic compounds (VOCs). These VOCs escape into the atmosphere while the heat curable composition dries. Such solvent based systems are undesirable because of the hazards and expenses associated with VOCs. The hazards include water and air pollution and the expenses include the cost of complying with strict government regulation on solvent emission levels. In contrast, UV curable compositions contain reactive monomers instead of solvents; thus eliminating the detrimental effects of the VOCs.

The use of heat curable compositions not only raises environmental concerns but other disadvantages exist with their use as well. Heat curable compositions suffer from slow cure times which lead to decreased productivity. These compositions require high energy for curing due to energy loss as well as the energy required to heat the substrate. Additionally, many heat curable compositions yield poor film properties that result in decreased value of the end product.

Although UV curable compositions exhibit superior properties and performance over their heat curable counterparts, UV curable compositions themselves suffer from certain disadvantages. Generally, UV compositions have high molecular weights and a substantial degree of cross linkage due to the highly reactive nature of the composition. As a result, many of these compositions suffer from low durability and resin shrinkage. With the use of many such compositions, an inordinately high amount of UV light is required to cure. With some compositions, suspended solids fall out of solution after a period of one to two days. This dispersion adversely affects the gloss and clarity of the finished product.

Accordingly, there exists a need to provide environmentally safe UV curable transparent conductive compositions which exhibit improved appearance and workability. Additionally, there is a need to provide a method of applying an improved composition which furthers the goal of improved performance.

SUMMARY OF INVENTION

It is an object of the present invention to provide an improved composition that upon curing by ultraviolet light produces a transparent conductive coating.

It is another object of the present invention to provide an improved composition suitable for use in touch screens, membrane switches, TV screens, and VCRs.

It is another object of the present invention to provide an improved composition suitable for coating a suitable substrate that can be applied by spraying, screen printing, dipping, and brushing.

It is still another object of the present invention to provide an improved composition that does not contain any significant amount of volatile organic solvents that do not become incorporated in the active layer after curing.

The present invention discloses an ultraviolet light curable transparent conductive composition and method for making such a composition that may be used to produce a transparent conductive coating on a suitable substrate. The disclosed composition does not contain any significant amount of volatile organic solvents that do not become incorporated in the active layer after curing. Specifically, the transparent conductive composition contains 5% or less volatile organic solvents by weight.

In accordance with one aspect of the invention, an ultraviolet light curable transparent conductive composition is provided. The transparent conductive composition comprises at least one aliphatic acrylated oligomer, an electrically conductive powder, and a photoinitiator. The aliphatic acrylated oligomer is present in an amount of about 10% to 40% of the total weight of the transparent conductive composition, the electrically conductive powder is present in an amount of about 20% to 50% of the transparent conductive composition, and the photinitiator is present in an amount of 2% to 10% of the total weight of the transparent conductive composition. All percentages of the transparent conductive composition as expressed in this document refer to the mass percentage of the stated component to the total mass of the transparent conductive composition in its fluid state at standard temperature and pressure.

The transparent conductive composition preferably further comprises an acrylated epoxy oligomer in an amount of about 3% to 11%, an isobornyl acrylate monomer in an amount of about 10% to 40% of the transparent conductive composition, and a flow promoting agent in an amount of about 0.1% to 8% of the transparent conductive composition.

In accordance with yet another aspect of the invention, a method is provided for depositing a transparent conductive coating on a substrate. The method comprises a first step of applying to the substrate a transparent conductive fluid-phase composition ("transparent conductive composition"). The transparent conductive composition comprises a mixture of one or more aliphatic acrylated oligomers, an electrically conductive powder, and a photoinitiator. Preferably, the aliphatic acrylated oligomer is present in an amount of about 10% to 40% of the total weight of the transparent conductive composition, the electrically conductive powder is present in an amount of about 20% to 50% of the total weight of the transparent conductive composition, and the photoinitiator is present in an amount of about 2% to 10% of the total weight of the transparent conductive composition. The transparent conductive composition preferably further comprises an acrylated epoxy oligomer in an amount of about 3% to 11% of the total weight of the transparent conductive composition, an isobornyl acrylate monomer in an amount of about 10% to 40% of the total weight of the transparent conductive composition, and a flow promoting agent in an amount of about 0.1% to 8% of the total weight of the transparent conductive composition.

The method also includes a second step of illuminating the transparent conductive composition on the substrate with an ultraviolet light to cause the transparent conductive composition to cure into the transparent conductive coating.

In accordance with this method, the transparent conductive composition can be selectively deposited on the substrate at specific locations where transparent conductive plating is desired. It need not be applied to the entire substrate.

BEST MODE FOR CARRYING OUT THE INVENTION

Transparent Conductive Compositions

Reference will now be made in detail to presently preferred compositions or embodiments and methods of the invention, which constitute the best modes of practicing the invention presently known to the inventor.

In accordance with one aspect of the invention, a presently preferred ultraviolet light curable transparent conductive composition ("transparent conductive composition") is provided. In this preferred embodiment, the transparent conductive composition includes a mixture of one or more aliphatic acrylated oligomers. The aliphatic acrylated oligomer mixture is present in an amount of about 10% to 40% of the total weight of the transparent conductive composition. The aliphatic acrylated oligomer mixture is more preferably present in an amount of about 20% to 30% of the total weight of the transparent conductive composition, and most preferably about 27% of the total weight of the transparent conductive composition. The aliphatic acrylated oligomer preferably comprises one or more urethane oligomers. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 (aliphatic urethane diacrylate diluted 12% by weight with 1,6-hexanediol diacrylate) urethanes, commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The preferred transparent conductive composition still further includes a conductive powder preferably in an amount of about 20% to 50% of the total weight of total weight of the transparent conductive composition. Specifically, the conductive powder is an electrically conductive powder. The conductive powder is more preferably present in an amount of about 30% to 40% of the total weight of total weight of the transparent conductive composition, and most preferably about 33% of the total weight of total weight of the transparent conductive composition. Preferred conductive powders include metal powders, metal oxide powders, metal nitride powders, or mixtures thereof. Suitable conductive powders include silver powder, tin oxide powder, antimony tin oxide, and indium tin oxide powder. The preferred conductive powders are the antimony tin oxide powders, Minatec 30 and Minatec 40, commercially available from EM Industries located in Hawthorne, N.Y.

This preferred transparent conductive composition also includes a photoinitiator in an amount of about 2% to 10% of the total weight of total weight of the transparent conductive composition. The photoinitiator is more preferably present in an amount of about 4% to 6% of the total weight of total weight of the transparent conductive composition, and most preferably about 5% of the total weight of total weight of the transparent conductive composition. Suitable photoinitiators include Irgacure 184 (1-hydroxycyclohexyl phenyl ketone), Irgacure 907 (2-methyl-1-[4-(methylthio) phenyl]-2-morpholino propan-1-one), Irgacure 369 (2-benzyl-2-N , N-dimethylamino-1-(4-morpholinophenyl)-1-butanone), Irgacure 500 (the combination of 50% 1-hydroxy cyclohexyl phenyl ketone and 50% benzophenone), Irgacure 651 (2,2-dimethoxy-1,2-diphenylethan-1-one), Irgacure 1700 (the combination of 25% bis(2,6-dimethoxybenzoyl-2,4-,4-trimethyl pentyl) phosphine oxide, and 75% 2-hydroxy-2-methyl-1-phenyl-propan-1-one) DAROCUR 1173 (2-hydroxy-2-methyl-1-phenyl-propan-1-one) and DAROCUR 4265 (the combination of 50% 2,4,6-trimethylbenzoyldiphenyl-phosphine oxide and 50% 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

This preferred transparent conductive composition further includes an acrylated epoxy oligomer. The acrylated epoxy oligomer is present in an amount of about 3% to 11% of the total weight of total weight of the transparent conductive composition. The acrylated epoxy oligomer is more preferably present in an amount of about 5% to 9% of the total weight of total weight of the transparent conductive composition, and most preferably about 7% of the total weight of total weight of the transparent conductive composition. Suitable acrylated epoxy oligomers include Radcure Ebecryl 3603 (novolac epoxy acrylate diluted 20% by weight with tripropylene glycol diacrylate), commercially available from Radcure UCB Corp.; Sartomer CN-120 (difunctional bisphenol based epoxy acrylate) and CN-124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which is a tri-functional acrylated epoxy novolac. Combinations of these materials may also be employed herein.

The photocurable mixture of the lubricating composition preferably includes an ethylenically unsaturated monomer having Formula I:

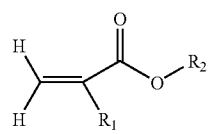

wherein $R_1$ is hydrogen or substituted or unsubstituted alkyl; and $R_2$ is substituted or unsubstituted alkyl having more than 4 carbon atoms, cycloalkyl, cycloalkenyl, or substituted or unsubstituted aryl. Preferably $R_1$ is hydrogen or methyl; and $R_2$ is isobornyl, phenyl, benzyl, dicylcopentenyl, diclypentenyl oxyethyl, cyclohexyl, and naphthyl. The most preferred ethyleneically unsaturated monomers are isobornyl acrylate monomers. The isoborynl acrylate monomers are preferably present in an amount of about 10% to 40% of the total weight of total weight of the transparent conductive composition. The isobornyl acrylate monomer is more preferably present in an amount of about 20% to 35% of the total weight of total weight of the transparent conductive composition, and most preferably about 28% of the total weight of total weight of the transparent conductive composition. Suitable isobornyl acrylate monomers include Sartomer SR-423 (isobornyl methacrylate):

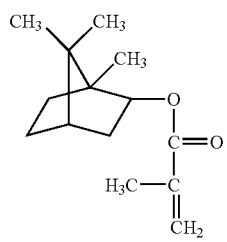

and SR-506 (isobornyl acrylate):

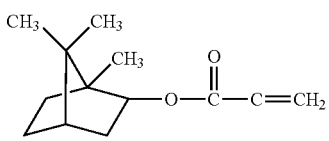

available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure IBOA is a high purity, low color monomer. Combinations of these materials may also be employed herein.

The preferred transparent conductive composition optionally includes a flow promoting agent in an amount of about 0.1% to 8%. The flow promoting agent is more preferably present in an amount of about 3% to 5% of the total weight of total weight of the transparent conductive composition, and most preferably about 3.5% of the total weight of total weight of the transparent conductive composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

To illustrate, the following example sets forth a presently preferred transparent conductive composition according to this aspect of the invention.

EXAMPLE 1

This example provides a preferred transparent conductive composition according to the invention. The transparent conductive composition was made from the following components:

| Component | Approximate Mass % |
|---|---|
| Ebecryl 264 | 26.7 |
| IBOA | 28.3 |
| Irgacure 1700 | 5.0 |
| Ebecryl 3603 | 6.6 |
| Modaflow | 3.5 |
| Minatec 30 | 33.4 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 3603, and Modaflow are introduced into the pan and mixed for 1 to 2 minutes at a speed of 2000 rpm. In the final step, the Minatec 30 is added and mixed at 2000 rpm for 1 to 2 minutes. The mixing is temporarily suspended if the temperature exceed 100° F.

EXAMPLE 2

This example provides a preferred transparent conductive composition according to the invention. The transparent conductive composition was made from the following components:

| Component | Approximate Mass % |
|---|---|
| Ebecryl 264 | 26.7 |
| IBOA | 28.3 |
| Irgacure 1700 | 5.0 |
| Ebecryl 3603 | 6.6 |
| Modaflow | 3.5 |
| Minatec 40 | 33.4 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 3603, and Modaflow are introduced into the pan and mixed for 1 to 2 minutes at a speed of 2000 rpm. In the final step, the Minatec 40 is added and mixed at 2000 rpm for 1 to 2 minutes. The mixing is temporarily suspended if the temperature exceed 100° F.

Method for Depositing a Transparent Conductive Coating

In accordance with still another aspect of the invention, a method is provided for depositing an transparent conductive coating on a suitable substrate. The method comprises a first step of applying a transparent conductive fluid-phase composition ("transparent conductive composition") to the substrate.

The transparent conductive composition comprises a mixture of one or more aliphatic acrylated oligomers, an electrically conductive powder, and a photoinitiator. Preferably, the aliphatic acrylated oligomer is present in an amount of about 10% to 40% of the total weight of the transparent conductive composition, the electrically conductive powder is present in an amount of about 20% to 50% of the total weight of the transparent conductive composition, and the photoinitiator is present in an amount of about 2% to 10% of the total weight of the transparent conductive composition. The transparent conductive composition preferably further comprises an acrylated epoxy oligomer in an amount of about 3% to 11% of the total weight of the transparent conductive composition, an isobornyl acrylate monomer in an amount of about 10% to 40% of the total weight of the transparent conductive composition, and a flow promoting agent in an amount of about 0.1% to 8% of the total weight of the transparent conductive composition. The preferred transparent conductive compositions according to this method are those described herein, for example, including the compositions described in examples 1 and 2.

The transparent conductive composition may be applied to the substrate using a number of different techniques. The transparent conductive composition may be applied, for example, by direct brush application, or it may be sprayed onto the substrate surface. It also may be applied using a screen printing technique. In such screen printing technique, a "screen" as the term is used in the screen printing industry is used to regulate the flow of liquid composition onto the substrate surface. The transparent conductive composition typically would be applied to the screen as the latter contacts the substrate. The transparent conductive composition flows through the silk screen to the substrate, whereupon it adheres to the substrate at the desired film thickness. Screen printing techniques suitable for this purpose include known techniques, but wherein the process is adjusted in ways known to persons of ordinary skill in the art to accommodate the viscosity, flowability, and other properties of the liquid-phase composition, the substrate and its surface properties, etc. Flexographic techniques, for example, using pinch rollers to contact the transparent conductive composition with a rolling substrate, also may be used.

The method includes a second step of illuminating the transparent conductive fluid-phase composition on the substrate with an ultraviolet light to cause the transparent conductive fluid-phase composition to cure into the transparent conductive coating. This illumination may be carried out in any number of ways, provided the ultraviolet light or radiation impinges upon the transparent conductive composition so that the transparent conductive composition is caused to polymerize to form the coating, layer, film, etc., and thereby cures.

Curing preferably takes place by free radical polymerization, which is initiated by an ultraviolet radiation source. The photoinitiator preferably comprises a photoinitiator, as described above.

Various ultraviolet light sources may be used, depending on the application. Preferred ultraviolet radiation sources for a number of applications include known ultraviolet lighting equipment with energy intensity settings of, for example, 125 watts, 200 watts, and 300 watts per square inch.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A photocurable transparent conductive composition comprising:
   at least one aliphatic acrylated oligomer selected from an aliphatic urethane diacrylate or aliphatic urethane triacrylate;
   an acrylated epoxy oligomer;
   an ethylenically unsaturated monomer having Formula I:

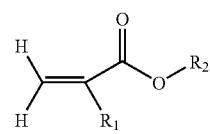

wherein $R_1$ is hydrogen or substituted or unsubstituted alkyl; and $R_2$ is substituted or unsubstituted alkyl having more than 4 carbon atoms, cycloalkyl, cycloalkenyl, or substituted or unsubstituted aryl;
   an electrically conductive powder present in an amount from 20% to 50% of the weight of the transparent conductive composition; and
   a photoinitiator,
   wherein the photoocurable transparent conductive composition is curable by ultraviolet light into a transparent conductive coating.

2. The photocurable transparent conductive composition of claim 1 wherein $R_1$ is hydrogen or methyl; and $R_2$ is isoborynl, phenyl, benzyl, dicylcopentenyl, diclypentenyl oxyethyl, cyclohexyl, and naphthyl.

3. The photocurable transparent conductive composition of claim 1 wherein the ethyleneically unsaturated monomer is an isobornyl acrylate monomer.

4. The transparent conductive composition of claim 3 wherein the isobornyl acrylate monomer is selected from the group consisting of isobornyl acrylate, isobornyl methacrylate, and mixtures thereof.

5. The photocurable transparent conductive composition of claim 1 wherein the electrically conductive powder a metal powders, a metal oxide powder, a metal nitride powder, or mixtures thereof.

6. The photocurable transparent conductive composition of claim 1 further comprising a flow promoting agent.

7. The photocurable transparent conductive composition of claim 6 wherein:
the aliphatic acrylated oligomer is 10% to 40% of the weight of the transparent conductive composition;
the acrylated epoxy oligomer is 3% to 11% of the weight of the transparent conductive composition;
the ethylenically unsaturated monomer is 10% to 40% of the weight of the transparent conductive composition;
the photoinitiator is 2% to 10% of the weight of the transparent conductive composition; and
the flow promoting agent is 0.1% to 8% of the weight of the transparent conductive composition.

8. The photocurable transparent conductive composition of claim 6 wherein:
the aliphatic acrylated oligomer is 20% to 30% of the weight of the transparent conductive composition;
the acrylated epoxy oligomer is 5% to 9% of the weight of the transparent conductive composition;
the ethylenically unsaturated monomer is 20% to 35% of the weight of the transparent conductive composition;
the photoinitiator is 4% to 6% of the weight of the transparent conductive composition;
the flow promoting agent is 3% to 5% of the weight of the transparent conductive composition; and
the electrically conductive powder is 30% to 40% of the weight of the transparent conductive composition.

9. The photocurable transparent conductive composition of claim 6 wherein:
the aliphatic acrylated oligomer is 27% of the weight of the transparent conductive composition;
the acrylated epoxy oligomer is 7% of the weight of the transparent conductive composition;
the ethylenically unsaturated monomer is 28% of the weight of the transparent conductive composition;
the photoinitiator is 5% of the weight of the transparent conductive composition;
the flow promoting agent is 3.5% of the weight of the transparent conductive composition; and
the electrically conductive powder is 33% of the weight of the transparent conductive composition.

10. The transparent conductive composition of claim 1 wherein the photoinitiator is selected from the group consisting of:
1-hydroxycyclohexyl phenyl ketone;
2-methyl-1-[4-(methylthio)phenyl]-2-morpholino propan-1-one;
the combination of 50% 1-hydroxy cyclohexyl phenyl ketone and 50% benzophenone;
2,2-dimethoxy-1,2-diphenylethan-1-one;
the combination of 25% bis(2,6-dimethoxybenzoyl-2,4-, 4-trimethyl pentyl phosphine oxide and 75% 2-hydroxy-2-methyl-1-phenyl-propan-1-one;
2-hydroxy-2-methyl-1-phenyl-1-propane;
the combination of 50% 2,4,6-trimethylbenzoyldiphenyl-phosphine oxide and 50% 2-hydroxy 2-methyl-1-phenyl-propan-1-one;
mixed triaryl sulfonium hexafluoroantimonate salts, mixed triaryl sulfonium hexafluorophosphate salts; and mixtures thereof.

11. The transparent conductive composition of claim 1 wherein the acrylated epoxy oligomer is selected from the group consisting of:
novolac epoxy acrylate diluted 20% by weight with tripropylene glycol diacrylate;
difunctional bisphenol based epoxy acrylate; and mixtures thereof.

12. A method for coating a substrate with a photocurable transparent conductive composition, the method comprising:
applying a transparent conductive composition to the substrate, wherein the transparent conductive composition includes:
an aliphatic acrylated oligomer selected from an aliphatic urethane diacrylate or aliphatic urethane triacrylate;
an acrylated epoxy oligomer;
an ethylenically unsaturated monomer having Formula I:

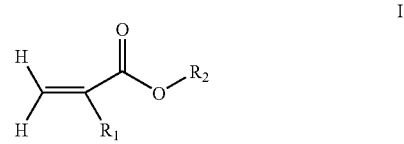

wherein $R_1$ is hydrogen or substituted or unsubstituted alkyl; and $R_2$ is substituted or unsubstituted alkyl having more than 4 carbon atoms, cycloalkyl, cycloalkenyl, or substituted or unsubstituted aryl;
a photoinitiator;
a flow promoting agent; and
an electrically conductive powder present in an amount from 20% to 50% of the weight of the transparent conductive composition; and
illuminating the transparent conductive composition with an UV light sufficient to cause the transparent conductive composition to cure into a transparent conductive coating.

13. The method of claim 12 wherein the ethyleneically unsaturated monomer is an isobornyl acrylate monomer.

14. The method of claim 12 wherein the isobornyl acrylate monomer is selected from the group consisting of isobornyl acrylate, isobornyl methacrylate, and mixtures thereof.

15. The method of claim 12 wherein the electrically conductive powder a metal powders, a metal oxide powder, a metal nitride powder, or mixtures thereof.

16. The method of claim 12, wherein UV light used in illuminating impinges upon the transparent conductive composition so that the transparent conductive composition is caused to form a coating as it cures.

17. The method of claim 12, wherein the method of applying the transparent conductive composition is spraying.

18. The method of claim 12, wherein the method of applying the transparent conductive composition is screen printing.

19. The method of claim 12, wherein the method of applying the transparent conductive composition is dipping the substrate into the composition sufficiently to cause the composition to uniformly coat the substrate.

20. A method for coating a substrate with a photocurable transparent conductive composition, the method comprising:
applying a transparent conductive composition to the substrate, wherein the transparent conductive composition includes:
an aliphatic acrylated oligomer selected from an aliphatic urethane diacrylate or aliphatic urethane triacrylate present in an amount from 10% to 40% of the weight of the transparent conductive composition;

an acrylated epoxy oligomer present in an amount from 3% to 11% of the weight of the transparent conductive composition;

an ethylenically unsaturated monomer present in an amount from 10% to 40% of the weight of the transparent conductive composition, the ethylenically unsaturated monomer having Formula I:

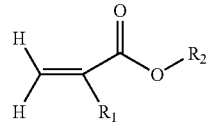

wherein $R_1$ is hydrogen or substituted or unsubstituted alkyl; and $R_2$ is substituted or unsubstituted alkyl having more than 4 carbon atoms, cycloalkyl, cycloalkenyl, or substituted or unsubstituted aryl;

a photoinitiator present in an amount from 2% to 10% of the weight of the transparent conductive composition;

a flow promoting agent present in an amount from 0.1% to 8% of the weight of the transparent conductive composition; and an electrically conductive powder present in an amount from 20% to 50% of the weight of the transparent conductive composition and illuminating the transparent conductive composition with an UV light sufficient to cause the transparent conductive composition to cure into a transparent conductive coating.

* * * * *

UNITED STATES PATENT AND TRADEMARK OFFICE
CERTIFICATE OF CORRECTION

PATENT NO.         : 7,119,129 B2                               Page 1 of 1
APPLICATION NO. : 10/913911
DATED              : October 10, 2006
INVENTOR(S)        : Roy C. Krohn It is certified that error appears in the above-identified patent and that said Letters Patent is hereby corrected as shown below:

Column 8, line 47, claim 1, delete "photoocurable"
insert threfor: --photocurable--

Column 8, line 63, claim 5, delete "a"
insert therefor: --is--

Column 8, line 64, claim 5, delete "powders"
insert therefor: --powder--

Column 10, line 41, claim 15, after conductive powder delete "a"
insert therefor: --is--

Column 10, line 41, claim 15, delete "powders"
insert therefor: --powder--

Signed and Sealed this

Twentieth Day of January, 2009

JON W. DUDAS
*Director of the United States Patent and Trademark Office*